United States Patent [19]

Inaba et al.

[11] Patent Number: 4,820,114
[45] Date of Patent: Apr. 11, 1989

[54] COMPLIANCE APPARATUS OF A ROBOT HAND

[75] Inventors: Ryohei Inaba; Yusaku Azuma, both of Yokohama; Shozou Kasai, Kawasaki, all of Japan

[73] Assignee: Canon Kabushiki Kaisha, Tokyo, Japan

[21] Appl. No.: 183,348

[22] Filed: Apr. 12, 1988

Related U.S. Application Data

[63] Continuation of Ser. No. 869,616, Jun. 2, 1986, abandoned.

[30] Foreign Application Priority Data

Jun. 5, 1985 [JP]  Japan ................................. 60-121880

[51] Int. Cl.⁴ ................................................ B66C 1/10
[52] U.S. Cl. ...................................... 414/751; 33/520; 33/644; 901/45
[58] Field of Search ........................ 33/169 C; 414/751

[56] References Cited

U.S. PATENT DOCUMENTS

| | | | |
|---|---|---|---|
| 3,583,752 | 6/1971 | Panisidi | 901/45 X |
| 4,145,802 | 3/1979 | D'Auria | 901/45 X |
| 4,332,066 | 6/1982 | Hailey et al. | 901/45 X |
| 4,484,854 | 11/1984 | Chitayat | 901/45 X |
| 4,595,334 | 6/1986 | Sharon | 901/45 X |
| 4,720,923 | 1/1988 | Quinton et al. | 901/45 X |

FOREIGN PATENT DOCUMENTS

83/03217  9/1983  PCT Int'l Appl. ................. 901/45

Primary Examiner—Frank E. Werner
Assistant Examiner—William M. Hienz
Attorney, Agent, or Firm—Fitzpatrick, Cella, Harper & Scinto

[57] ABSTRACT

In a compliance apparatus wherein a movable plate movable in a direction perpendicular to the direction of insertion of a gripped part is provided on a portion in which a robot hand is mounted to a robot arm to thereby enable relative displacement of the robot hand and the robot arm, a plurality of cylinders of which the extended end positions are adjustable and of which the protruding force can be changed by a spring or fluid are opposed to one another as positioning devices for the movable plate and sandwich the movable plate therebetween.

1 Claim, 5 Drawing Sheets

COMPLIANCE APPARATUS OF A ROBOT HAND

This application is a continuation of application Ser. No. 869,616 filed 6/2/86, now abandoned.

BACKGROUND OF THE INVENTION

1. Field of the Invention

This invention relates to a compliance apparatus of a robot hand which reduces the deviation in taking-up force caused by the positional deviation between an inserting part and an inserted part and enables high accuracy assembly.

2. Related Background Art

Appartuses as shown in FIGS. 1 and 2 of the accompanying drawings have heretofore been used as an apparatus for fitting an inserting part into an inserted part. In FIG. 1, reference numeral 52 designates a robot hand, reference numeral 53 denotes an inserting part, reference numeral 61 designates a flexible member such as rubber, and reference numeral 71 denotes a movable plate supported by the flexible member 61. If rubber or the like is employed as the flexible member 61 as shown in FIG. 1, a great force is required for the movement of the movable plate 71 from the viewpoints of material and structure and during no-load (the state before the inserting part fits to the inserted part), the movable plate 71 does not return to a predetermined position (the hand position), and this has led to poor self-return accuracy.

In FIG. 2, reference numeral 62 designates a flexible member such as a spring which biases a fixed plate 63 from the circumference thereof to thereby determine the position of a movable plate 64. In the method of positioning the movable plate 64 which uses the biasing force of a spring or the like as in FIG. 2, the position of the movable plate 64 is determined by the balance of the spring and is therefore greatly affected by the friction of the slide mechanism of the movable plate 64 and it is difficult to construct the parts of materials identical in spring constant, and this has also led to poor self-return accuracy as in the apparatus shown in FIG. 1.

Thus, in the conventional apparatuses, a great force is required to take up the positional deviation between the inserting part and the inserted part, and the amount of deviation to be taken up is great and during the insertion of parts, a load greater than necessary is applied to the parts, and this has led to a problem that the parts are injured and abrasion powder is produced. Further, the positioning of the movable plate has been effected by only a flexible member such as rubber or a spring and this has caused vibration of the robot hand, which in turn has led to a problem that it is difficult to move the robot arm at a high speed.

SUMMARY OF THE INVENTION

It is an object of the present invention to overcome the above-noted disadvantages and to provide a highly accurate compliance apparatus of a robot hand in which means is provided for taking up any relative positional deviation between an inserted part and an inserting part during the automatic assembly by a robot.

It is another object of the present invention to provide a compliance apparatus of a robot hand in which a movable portion attendant on the robot hand can highly accurately return to a predetermined position during no-load.

It is still another object of the present invention to provide a compliance apparatus of a robot hand in which the positioning force of positioning means for a movable portion attendant on the robot hand is made variable.

Other objects of the present invention will become apparent from the following detailed description of a specific embodiment thereof taken in conjunction with the accompanying drawings.

DESCRIPTION OF THE PREFERRED EMBODIMENT

Figure 1:
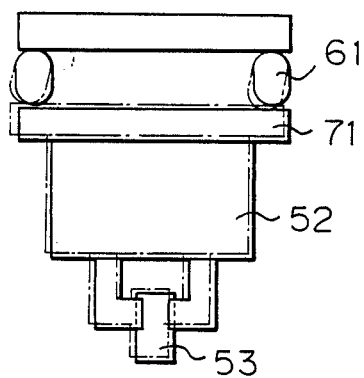
FIG. 1 is a longitudinal cross-sectional view showing an example of the compliance apparatus according to the prior art.
Figure 2:
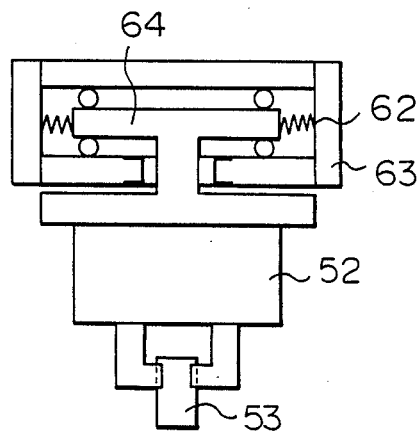
FIG. 2 is a longitudinal cross-sectional view showing another example of the compliance apparatus according to the prior art.
Figure 3:
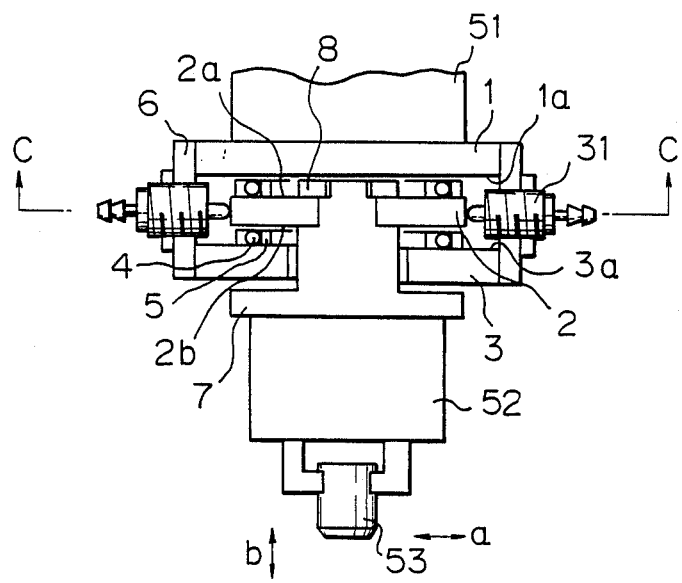
FIG. 3 is a longitudinal cross-sectional view of an embodiment of the present invention.
Figure 4:
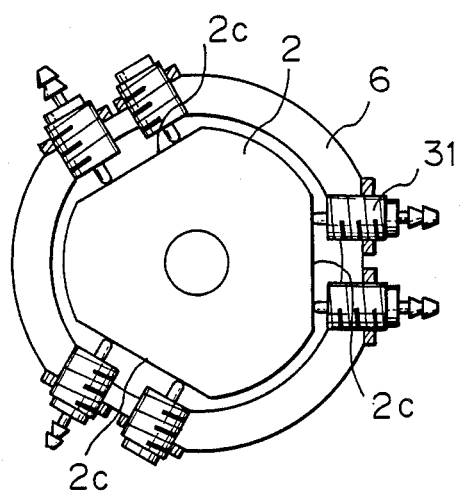
FIG. 4 is a cross-sectional view taken along line C—C of FIG. 3.
Figure 5A:
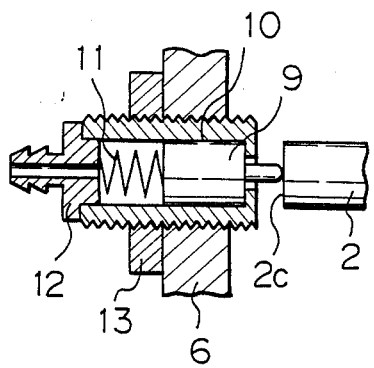
FIGS. 5A and 5B illustrate a portion of FIG. 3.
Figure 5B:
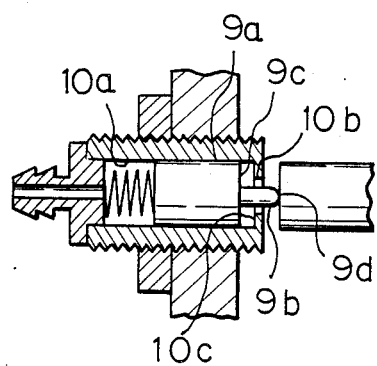

An embodiment of the present invention will hereinafter be described with reference to the drawings. IN FIGS. 3 and 4, reference numeral 1 designates a mounting and fixing plate with respect to a robot arm. The underside 1a of the mounting and fixing plate 1 provides the slide guide portion of a movable plate 2 which is a movable portion to be described. In the present embodiment, the movable portion 2 is comprised of the movable plate and has slide guide portions 2a on the opposite side thereof and at least three planar positioning end surfaces 2c on the outer peripheral portion thereof. Reference numeral 3 denotes an underside fixing plate. The upper surface 3a of the underside fixing plate 3 provides the slide guide portion of the movable plate 2. Reference numeral 4 designates steel balls, reference numeral 5 denote a retainer for retaining the steel balls 4, and reference numeral 6 designates a fixing plate connecting plate. The above-described elements makes the movable plate 2 displaceable only in the direction of arrow a perpendicular to the axis of insertion of parts and undisplaceable in the direction b of the axis of insertion. Reference numeral 7 denotes a hand mounting plate fixed to the movable plate 2, reference numeral 8 designates lock nuts for the hand mounting plate 7, reference numeral 51 denotes the end portion of the robot arm, reference numeral 52 designates a robot hand, reference numeral 53 denotes an inserting part, and reference numeral 54 (FIG. 6B) designates an inserted part. Reference numeral 31 denotes cylinders for positioning the movable plate 2 which form a characteristic part of the present embodiment. The details of the cylinders 31 are shown in FIGS. 5A and 5B. FIG. 5A shows a state in which the movable plate 2 is being positioned, and FIG. 5B shows a state in which the movable plate 2 has been displaced. Reference numeral 9 designates a positioning piston fitted to a cylinder tube 10. The positioning piston 9 has a large-diametered portion 9a and a small-diametered portion 9b forming a positioning end 9d, and the level difference portion 9c therebetween provides an abutment surface with respect to the level difference portion 9c of the piston. Reference numeral 11 designates a spring, reference numeral 13 denotes the back lid and fluid connecting joint of the cylinder tube, and reference numeral 13 designates the lock nut of the cylinder tube. The aforementioned fixing plate connecting plate 6 is provided with a plurality of female screws matching the male screws of the cylinder tube 10, and a plurality of positioning cylinders having the above-described elements are provided around the movable plate 2 in opposed relationship with one another, and the position of the positioning end 9d thereof may be fixed after adjusted in the direction a perpendicular to the axis of insertion of parts. At that time, the plurality of opposed positioning cylinders are positionally adjusted and fixed with each positioning end 9d being in contact with the positioning end surface 2c of the movable plate 2 as shown in FIG. 5A and with the level difference portion 9c of the piston in each positioning cylinder being in contact with the level difference portion 10c of the cylinder tube.

Figure 6A:
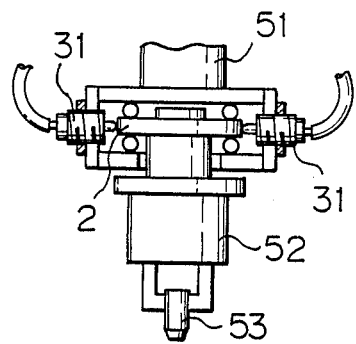
FIGS. 6A-6E illustrate the operating condition of an embodiment of the present invention.
Figure 6B:
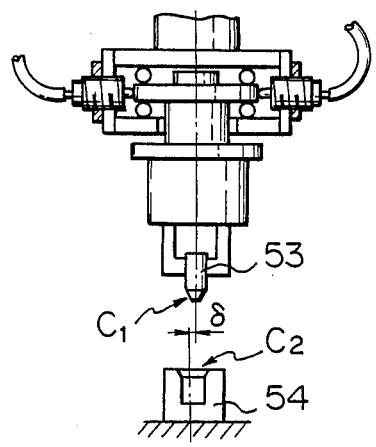
Figure 6C:
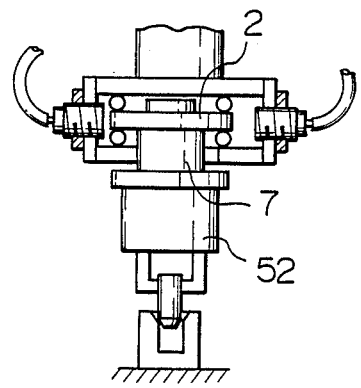
Figure 6D:
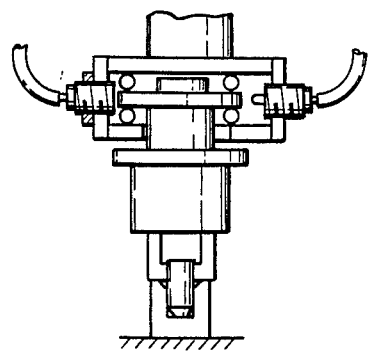
Figure 6E:
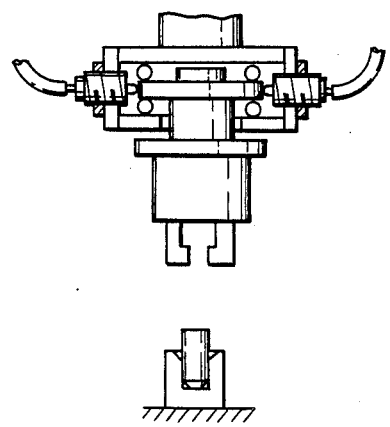

The operation sequence in the above-described construction will now be described with reference to FIGS. 6A–6E. FIG. 6A shows a state in which the robot hand 52 grips and conveys the inserting part 53 with the aid of horizontal movement of the robot arm 51. At this time, fluid (for example, compressed air) is supplied to the positioning cylinders 31 which are positioning the movable plate 2, and the piston 9 is positioned and fixed so that the movable plate 2 may not be moved during the movement of the robot arm. FIG. 6B shows a state in which above the inserted part 54, the robot arm is stopped and the inserting part 53 is about to be inserted into the inserted part 54 by the movement of the robot arm in the direction of the axis of insertion. At this time, the relative position of the inserting part 53 and the inserted part 54 deviates by $\delta$. But this amount of positional deviation $\delta$ is less than the sum of the amounts of chamfering $C_1$ and $C_2$ provided on at least one of the inserting part 53 and the inserted part 54. By the time when the horizontal movement of the robot arm has been terminated and at least the mating between the inserting part 53 and the inserted part 54 has been started, the supply of the fluid to the positioning cylinder of said movable plate 2 is cut off and the piston 9 is positioned by only the spring 11 contained therein. FIG. 6C shows a state in which the robot arm is being moved in the direction of the axis of insertion, and in this state, the inserting part 53 and the inserted part 54 have already started their mating. At this time, there is relative positional deviation between the inserting part 53 and the inserted part 54 and therefore, they are subjected to the reaction force in the chamfered portions $C_1$ and $C_2$ when the insertion is started. By the horizontal component of this reaction force, the movable plate 2 flexes the spring 11 contained in each positioning cylinder through the inserting part 53, the robot hand 52 and the hand mounting plate 7 and is displaced only horizontally, and by the time when the inserting part 53 has begun to mate with the inserted part 54 and has passed through the chamfered portions, the amount of relative positional deviation $\delta$ between the inserting part 53 and the inserted part 54 is automatically taken up and the mating and insertion thereof becomes possible. Fig. 6D shows a state in which the robot arm has been moved in the direction of the axis of insertion and the insertion has been terminated, and FIG. 6E shows a state in which the inserting part 53 has been unclamped and the robot hand 52 has been retracted. At this time, the movable plate 2 is automatically returned to its original position by the spring 11 contained in each positioning cylinder. By the fluid being again supplied to the positioning cylinders, the movable plate 2 is fixed and horizontal movement of the robot arm can be started.

In the present embodiment, if instead of a bias member comprised of fluid such as compressed air or oil and a spring or the like being used in the positioning cylinders, each positioning cylinders is comprised of, for example, a servo motor and a spring or the like and further, position control is added to force control and this is combined with a visual sensor, then there can be provided a versatile insertion apparatus which can be mated and inserted even if there is relative positional deviation exceeding the amount of chamfering between the inserting part and the inserted part.

According to the present invention, a plurality of positioning cylinders are provided around the movable plate in opposed relationship with one another and sandwich the movable plate positioning means, whereby the position of the movable plate can be determined by the positions of the extended ends of the pistons of the positioning cylinders and therefore, as compared with the conventional system in which the position of the movable plate was determined by the balance of the force of a flexible member such as a spring, the accuracy of the positioning of the movable plate can be improved easily. For example, the accuracy of the positioning has heretofore been $\pm 50$ $\mu$, whereas according to the present invention, it can be improved to $\pm 6\mu$. Thus, the position representability of the robot hand mounted on the movable plate becomes good, the amount of relative positional deviation between the inserted part and the inserting part can be reduced and the deviation taking-up stroke can be reduced. Also, the spring which biases the piston within each positioning cylinder should only have a minimum force which can move the piston and the movable plate and, as compared with the conventional system in which the position of the movable plate was determined by the balance of a flexible member such as a spring, the spring force and the spring constant can be made small. Thus, the amount of take-up and the force of take-up of the relative positional deviation between the inserted part and the inserting part can be made small, and the injury, abrasion powder, etc. caused during the insertion of parts can be minimized. Further, as required, fluid may be supplied to the positioning cylinders to thereby lock the positioning pistons, and this leads to the effect that the problem of the vibration of the robot hand caused by the compliance apparatus during movement of the robot arm can be solved and the robot arm can be conveyed at a high speed.

What is claimed is:

1. An apparatus comprising:
a movable member;
means for supporting said movable member in a vertical direction and permitting translational and rotational movement in a horizontal plane, said movable member having having three end surfaces on an outer periphery thereof;
grip means for gripping an article, said means being attached to said movable member;
control means for controlling said movable member in a movable condition in the horizontal plane and in a fixed condition;
said control means comprising,
a plurality of cylinders provided opposed to each said end surface,
a spring member provided in each of said cylinders, a plurality of retractable pistons for pressing said end surfaces of said movable member, each said piston being inserted in said cylinder and having one end thereof projected through an opening of said cylinder by a biasing force of said spring;

lock means connected to said cylinder for locking the movement of said piston, wherein a locking operation of said lock means is released when said grip means grips and inserts the article into a predetermined position.

* * * * *

UNITED STATES PATENT AND TRADEMARK OFFICE
CERTIFICATE OF CORRECTION

PATENT NO. : 4,820,114

DATED : April 11, 1989

INVENTOR(S) : Inaba, et al.

It is certified that error appears in the above-identified patent and that said Letters Patent is hereby corrected as shown below:

COLUMN 2

Line 27, change "IN" to --In--; and
Line 35, change "side" to --sides--.

COLUMN 4

Line 58, delete "having" (second occurrence)

Signed and Sealed this

Sixth Day of March, 1990

Attest:

JEFFREY M. SAMUELS

*Attesting Officer*    Acting Commissioner of Patents and Trademarks